United States Patent
Warren

(10) Patent No.: US 8,010,156 B2
(45) Date of Patent: Aug. 30, 2011

(54) EYEGLASSES WITH ELECTRONIC COMPONENTS

(75) Inventor: Peter Warren, Chattanooga, TN (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 12/859,162

(22) Filed: Aug. 18, 2010

(65) Prior Publication Data

US 2010/0309427 A1    Dec. 9, 2010

Related U.S. Application Data

(63) Continuation of application No. 11/418,154, filed on May 3, 2006, now abandoned, which is a continuation of application No. 11/371,692, filed on Mar. 9, 2006, now Pat. No. 7,231,038, which is a continuation of application No. 09/888,280, filed on Jun. 21, 2001, now Pat. No. 7,013,009.

(51) Int. Cl.
*H04B 7/00*     (2006.01)
*G02C 5/20*     (2006.01)
*H04M 1/05*    (2006.01)

(52) U.S. Cl. ..................... 455/556.1; 351/158

(58) Field of Classification Search ............. 455/41.2, 455/344, 556.1, 575.6; 351/123, 41, 111, 351/118, 119, 158
See application file for complete search history.

(56) References Cited

U.S. PATENT DOCUMENTS

| | | | |
|---|---|---|---|
| 2,856,466 A | 10/1958 | Gustafson et al. |
| 3,536,385 A | 10/1970 | Johnston |
| 3,588,384 A | 6/1971 | Negley |
| 3,665,122 A | 5/1972 | Weiss |
| 3,809,829 A | 5/1974 | Vignini et al. |
| 3,883,701 A | 5/1975 | Delorenzo |
| 3,943,925 A | 3/1976 | Leight |
| 4,550,984 A | 11/1985 | Reymond |
| 4,683,587 A | 7/1987 | Silverman |
| 4,712,244 A | 12/1987 | Zwicker |
| 4,773,095 A | 9/1988 | Zwicker |
| 4,806,011 A | 2/1989 | Bettinger |
| 4,882,769 A | 11/1989 | Gallimore |
| 4,902,120 A | 2/1990 | Weyer |
| 4,904,078 A | 2/1990 | Gorike |

(Continued)

FOREIGN PATENT DOCUMENTS

EP    0840465    6/1998

(Continued)

OTHER PUBLICATIONS

Bluetooth Specification Version 1.1, Feb. 22, 2001, pp. 1-452.

(Continued)

*Primary Examiner* — Blane J Jackson
(74) *Attorney, Agent, or Firm* — Knobbe, Martens, Olson & Bear, LLP

(57) ABSTRACT

A microphone, transmitter, speaker, receiver, and power source, all mounted to an eyeglasses frame, for sending and receiving signals wirelessly to and from a remote cell phone or other electronic device. The microphone and the transmitter can be mounted to extension arms that can be extended, pivoted, or otherwise moved to a position for use, and then moved to a stored position when not in use. Alternatively, the microphone, transmitter, speaker, receiver, and power source, can be mounted onto a clip-on or other attachment member that mounts onto a conventional eyeglasses frame, or to a hat or other article worn on the head.

20 Claims, 7 Drawing Sheets

U.S. PATENT DOCUMENTS

| | | | |
|---|---|---|---|
| 5,020,150 | A | 5/1991 | Shannon |
| 5,029,216 | A | 7/1991 | Jhabvala et al. |
| 5,159,639 | A | 10/1992 | Shannon et al. |
| 5,327,178 | A | 7/1994 | McManigal |
| 5,335,285 | A | 8/1994 | Gluz |
| 5,353,378 | A | 10/1994 | Hoffman |
| 5,367,345 | A | 11/1994 | Da Silva |
| RE35,051 | E | 10/1995 | Moore |
| 5,563,951 | A | 10/1996 | Wang et al. |
| 5,579,400 | A | 11/1996 | Ballein |
| 5,606,743 | A | 2/1997 | Vogt et al. |
| 5,608,808 | A | 3/1997 | Da Silva |
| 5,634,201 | A | 5/1997 | Mooring |
| 5,694,475 | A | 12/1997 | Boyden |
| 5,703,670 | A | 12/1997 | Callard |
| 5,708,724 | A | 1/1998 | Burris et al. |
| 5,715,323 | A | 2/1998 | Walker |
| 5,717,479 | A | 2/1998 | Rickards |
| 5,737,436 | A | 4/1998 | Boyden |
| 5,757,929 | A | 5/1998 | Wang et al. |
| 5,892,564 | A | 4/1999 | Rahn |
| 5,909,498 | A | 6/1999 | Smith |
| 6,010,216 | A | 1/2000 | Jesiek |
| 6,012,812 | A | 1/2000 | Rickards |
| 6,091,546 | A | 7/2000 | Spitzer |
| 6,091,832 | A | 7/2000 | Shurman et al. |
| D430,145 | S | 8/2000 | Boyden et al. |
| 6,176,576 | B1 * | 1/2001 | Green et al. ................. 351/123 |
| 6,218,958 | B1 | 4/2001 | Eichstaedt et al. |
| 6,233,344 | B1 | 5/2001 | Clegg et al. |
| 6,252,970 | B1 | 6/2001 | Poon et al. |
| D445,416 | S | 7/2001 | Glezerman |
| 6,272,359 | B1 | 8/2001 | Kivela et al. |
| 6,301,050 | B1 | 10/2001 | DeLeon |
| 6,301,367 | B1 | 10/2001 | Boyden et al. |
| 6,325,507 | B1 | 12/2001 | Jannard et al. |
| 6,349,001 | B1 | 2/2002 | Spitzer |
| 6,409,338 | B1 * | 6/2002 | Jewell ........................... 351/158 |
| 6,421,031 | B1 | 7/2002 | Ronzani et al. |
| D462,946 | S | 9/2002 | Beraut et al. |
| 6,445,805 | B1 | 9/2002 | Grugel |
| 6,456,721 | B1 | 9/2002 | Fukuda |
| 6,483,483 | B2 | 11/2002 | Kosugi et al. |
| 6,490,362 | B1 | 12/2002 | Clegg et al. |
| 6,582,075 | B1 | 6/2003 | Swab et al. |
| 6,629,076 | B1 | 9/2003 | Haken |
| 6,729,726 | B2 | 5/2004 | Miller et al. |
| 6,769,767 | B2 | 8/2004 | Swab et al. |
| 6,966,647 | B2 | 11/2005 | Jannard et al. |
| 7,004,582 | B2 | 2/2006 | Jannard et al. |
| 7,013,009 | B2 | 3/2006 | Warren |
| 7,097,300 | B2 | 8/2006 | Himmele |
| 7,099,464 | B2 * | 8/2006 | Lucey et al. .................. 379/430 |
| 7,124,425 | B1 | 10/2006 | Anderson. |
| 7,147,324 | B2 | 12/2006 | Jannard |
| 7,150,526 | B2 | 12/2006 | Jannard |
| 7,213,917 | B2 | 5/2007 | Jannard et al. |
| 7,216,973 | B2 | 5/2007 | Jannard |
| 7,219,994 | B2 | 5/2007 | Jannard et al. |
| 7,231,038 | B2 | 6/2007 | Warren |
| 7,264,350 | B2 | 9/2007 | Jannard et al. |
| 7,278,734 | B2 | 10/2007 | Jannard et al. |
| 7,682,018 | B2 | 3/2010 | Jannard |
| 7,744,213 | B2 | 6/2010 | Jannard et al. |
| 2001/0038491 | A1 | 11/2001 | Fergason |
| 2002/0039063 | A1 | 4/2002 | Ritter |
| 2002/0098877 | A1 | 7/2002 | Glezerman |
| 2002/0111197 | A1 | 8/2002 | Fitzgerald |
| 2002/0118825 | A1 | 8/2002 | Mitra |
| 2002/0176330 | A1 | 11/2002 | Ramonowski et al. |
| 2002/0186180 | A1 | 12/2002 | Duda |
| 2002/0197961 | A1 | 12/2002 | Warren |
| 2003/0068057 | A1 | 4/2003 | Miller et al. |
| 2004/0000733 | A1 | 1/2004 | Swab et al. |
| 2004/0015403 | A1 | 1/2004 | Moskowitz et al. |
| 2004/0156012 | A1 | 8/2004 | Jannard et al. |
| 2004/0157649 | A1 | 8/2004 | Jannard et al. |
| 2004/0160572 | A1 | 8/2004 | Jannard et al. |
| 2004/0160573 | A1 | 8/2004 | Jannard et al. |
| 2004/0239874 | A1 | 12/2004 | Swab et al. |
| 2005/0046789 | A1 | 3/2005 | Jannard et al. |
| 2005/0185815 | A1 | 8/2005 | Rickards |
| 2005/0201585 | A1 | 9/2005 | Jannard et al. |
| 2005/0219152 | A1 | 10/2005 | Budd |
| 2005/0239502 | A1 * | 10/2005 | Swab et al. ................. 455/556.1 |
| 2005/0283263 | A1 | 12/2005 | Eaton et al. |
| 2006/0072067 | A1 | 4/2006 | Jannard |
| 2006/0132382 | A1 | 6/2006 | Jannard |
| 2006/0146277 | A1 | 7/2006 | Jannard |
| 2006/0183427 | A1 | 8/2006 | Warren |
| 2006/0197907 | A1 | 9/2006 | Jannard |
| 2006/0203183 | A1 | 9/2006 | Jannard |
| 2006/0203184 | A1 | 9/2006 | Jannard |
| 2007/0008484 | A1 | 1/2007 | Jannard |
| 2007/0037520 | A1 | 2/2007 | Warren |
| 2008/0089545 | A1 | 4/2008 | Jannard et al. |
| 2009/0086159 | A1 | 4/2009 | Jannard et al. |

FOREIGN PATENT DOCUMENTS

| | | |
|---|---|---|
| JP | 42-022998 | 11/1942 |
| JP | 10-513021 | 12/1998 |
| WO | WO 96/23373 | 8/1996 |
| WO | WO 99/50706 | 10/1999 |
| WO | WO 00/65803 | 11/2000 |
| WO | WO 00/70390 | 11/2000 |

OTHER PUBLICATIONS

Complaint for Patent and Trade Dress Infringement; U.S. District Court—Central District of California; Case No. SA-CV-07-1184 AHS (ANx); *Oakley, Inc.* v. *Audio Visual Allstar dba AVAsunglasses. com*; Filed Oct. 4, 2007; this lawsuit is settled and dismissed.

Complaint for Patent Infringement; U.S. District—Central District of California; Southern Division; Case No. SACV 06-8999 JVS(MLGx); *Oakley, Inc.* v. *Xonix Electronics Co., Ltd.*, Filed: Sep. 26, 2006; this lawsuit is currently pending.

Complaint for Patent Infringement; U.S. District Court—Central District of California, Southern Division; Case No. SACV 07-558 AG (RNBx); *Oakley, Inc.* v. *Practical Enterprises, Inc.*, Filed: May 16, 2007; this lawsuit was settled and dismissed.

Complaint for Patent Infringement; U.S. District Court—Central District of California; Case No. 03-6284 (GAF)(FMOx); *QR Spex, Inc. and Thomas G. Swab* v. *Motorola, Inc. and Frog Design, Inc.*; Filed Sep. 3, 2003; this lawsuit was transferred to the Central District of California from the Eastern District of Texas and is currently pending.

Complaint for Patent Infringement; U.S. District Court—Central District of Californai CAse No. 07-CV-1153 AHS (PJWx); *Oakley, Inc.* v. *Zeal Optics, Inc.*; Filed Sep. 28, 2007; this lawsuit is currently pending.

Complaint for Patent Infringement; U.S. District Court —Central District of California, Case No. SACV 09-00062 JVS (ANx); *Oakley, Inc.* v. *Spencer Gifts, LLC.*; Filed Jan. 14, 2009; this lawsuit is currently pending.

Complaint for Patent Infringement; U.S. District Court—Central District of California, Southern Division; Case No. SACV 07-57 DOC (ANx); *Oakley, Inc.* v. *Blue Diamond International*, Filed: Jan. 16, 2007 this lawsuit resulted in a default judgment.

Complaint for Patent Infringement; U.S. District Court—Central District of California, Southern Division; Case No. SACV 07-671 AG (RNBx); *Oakley, Inc.* v. *Xonix (Zhuhai) Electronics Co., Ltd. et al.*, Filed: Jun. 7. 2007; this lawsuit is settle and dismissed.

Complaint for Patent Infringement; U.S. District Court—Central District of California, Southern Division; Case No. SACV 07-888 CJC (RCx); *Oakley, Inc.* v. *The Pep Boys Manny Moe & Jack of California, Inc. et al.*, Filed: Aug. 1, 2007; this lawsuit is settled and dismissed.

Decision Dismissing Request to Strike Detailed Request for Reexamination, received Jun. 11, 2009 in U.S. Reexam Appl. No. 90/009,088, 5 pages.

Defendant Motorola, Inc.'s Responses to Plaintiffs' First Set of Interrogatories; U.S. District Court—Central District of California; Case No. CV 03-6284 JFW (FMOx); *QR Spex, Inc. and Thomas G. Swab* v. *Motorola, Inc. and Frog Design, Inc.*; Filed Apr. 26, 2004; this lawsuit was transferred to the Central District of California from the Eastern District of Texas and is currently pending.
Defendants' Preliminary Invalidity Contentions re U.S. Patent No. 6,769,767, including Exhibit, U.S. District Court—Eastern District of Texas; Case No. 5:06CV124; U.S. District Court—Central District of California; Case No. SACV 06-627 CJC (RNBx); *QR Spex, Inc.* v. *Oakley, Inc., Oakley Sales Corp., Oakley Direct, Inc., and Motorola, Inc.*; This lawsuit is currently pending.
Defendants' Preliminary Invalidity Contentions re U.S. Patent No. 7,331,666 and Addendum, U.S. District Court—Eastern District of Texas; Case No. 5:06CV124; U.S. District Court—Central District of California; Case No. SACV 06-627 CJC (RNBx); *QR Spex, Inc.* v. *Oakley, Inc., Oakley Sales Corp., Oakley Direct, Inc., and Motorola, Inc.*; Filed Nov. 3, 2008; This lawsuit is currently pending.
Determination of Decision Granting Ex Parte Reexamination, received in U.S. Reexam Appl. No. 90/009,088, Jun. 12, 2008, 14 pages.
Determination of Decision Granting Ex Parte Reexamination, received in U.S. Reexam Appl. No. 90/009,112, Jun. 16, 2008, 14 pages.
First Amended Complaint and Application for Permanent Injunction; U.S. District—Eastern District of Texas (Texarkana Division); Civil Action No. 506 CV 124; *QR Spex, Inc.* v. *Motorola, Inc.; Oakley, Inc.; Oakley Sales Corp.; Oakley Direct Inc.; Zeal Optics, Inc; Xonix Electronic Co., Ltd; and Kyocera Wireless Corp.*, Filed: Jul. 27, 2006; this lawsuit is currently pending.
First Amended Complaint for Patent Infringement; U.S. District—Central District of California; Case No. SACV06-244 AHS (MLGx); *Oakley, Inc.* v. *Overstock.Com, Inc., Woot.Com, Inc. dba Synapse Micro, Inc., Global American Technologies, LLC., Aigo, Corp.*, Filed: Mar, 27, 2006; this lawsuit has been settled in part.
First Amended Complaint for Patent Infringement; U.S. District Court—Central District of California; Case No. SACV 05-1099 AHS (MLGx); *Oakley, Inc.* v. *BMW of North America, LLC.*, Filed: Nov, 28, 2005; this lawsuit has been settled and dismissed.
Motorola Bluetooth Wireless Headset User Guide, 2001, 27 pgs.
Motorola Consumer Catalog for Phone Accessories from "www.commerce.motorola.com", web site visited on Jun. 13, 2002.
Notice of Intent to Issue Ex Parte Reexamination Certificate, received Jul. 7, 2009 in U.S. Reexam Appl No. 90/009,088, 10 pages.
Notice of Intent to Issue Ex Parte Reexamination Certificate, received Jul. 7, 2009 in U.S. Reexam Appl No. 90/009,112, 11 pages.
Office Action (Peition Decision Denying Request to Vacate as Non-Compliant) received in U.S. Reexam Appl. No. 90/009,088, mailed Mar. 11, 2009, 16 pages.
Office Action (Petition Decision Denying Request to Vacate as Non-Compliant) received in U.S. Reexam Appl. No. 90/009,112, mailed Mar. 11, 2009, 26 pages.
Patent Owner's Statement under 37 C.F.R. § 1.530, filed in U.S. Reexam Appl. No. 90/009,088, Aug. 12, 2008, 4 pages.
Patent Owner's Statement under 37 C.F.R. § 1.530, filed in U.S. Reexam Appl. No. 90/009,112, Aug. 13, 2008, 5 pages.
Petition Decision Denying Request to Vacate as Non-Compliant [37 CFR 1.181(a)&C], received in U.S. Reexam Appl. No. 90/009,088, Jun. 11, 2009, 5 pages.
Petition Decision Denying Request to Vacate as Non-Compliant [37 CFR 1.181(a)&C], received in U.S. Reexam Appl. No. 90/009,112, Mar. 11, 2009, 5 pages.
Petition under 37 C.F.R. 1.182 to Strike Detailed Request for Reexamination due to Non-Compliance with at Least MPEP 2205, filed in U.S. Reexam Appl. No. 90/009,088, Aug. 12, 2008, 4 pages.
Petition under 37 C.F.R. 1.182 to Strike Detailed Request for Reexamination due to Non-Compliance with at Least MPEP 2205, filed in U.S. Reexam Appl. No. 90/009,112, Aug. 13, 2008, 4 pages.
Plaintiffs' Response to Defendant Motorola, Inc's First Set of Request for Admission; U.S. District Court— Central District of California; Case No. CV 03-6284 JFW (FMOx); *QR Spex, Inc. and Thomas G. Swab* v. *Motorola, Inc. and Frog Design, Inc.*; Filed Mar. 12, 2004; this lawsuit was transferred to the Central District of California from the Eastern District of Texas and is currently pending.
Plaintiffs' Response to Defendant Motorola, Inc's First Set of Special Interrogatories; U.S. District Court— Central District of California; Case No. CV 03-6284 JFW (FMOx); *QR Spex, Inc. and Thomas G. Swab* v. *Motorola, Inc. and Frog Design, Inc.*; Filed Mar. 12, 2004; this lawsuit was transferred to the Central District of California from the Eastern District of Texas and is currently pending.
Plaintiffs' Supplemental Response to Defendant Motorola, Inc.'s First Set of Interrogatories; U.S. District Court—Central District of California; Case No. CV 03-6284 JFW (FMOx); *QR Spex, Inc. and Thomas G. Swab* v. *Motorola, Inc. and Frog Design, Inc.*; Filed May 18 2004; this lawsuit was transferred to the Central District of California from the Eastern District of Texas and is currently pending.
Receipt of Original Ex Parte Request by Third Party, filed in U.S. Reexam Appl. No. 90/009,088, Mar. 20, 2008, 60 pages.
Receipt of Original Ex Parte Request by Third Party, filed in U.S. Reexam Appl. No. 90/009,112, Apr. 16, 2008, 75 pages.
Reexam Litigation Search conducted in U.S. Reexam Appl. No. 90/009,112, Jul. 1, 2009, 19 pages.
Reexam Litigation Search conducted in U.S. Reexam Appl. No. 90/009,112, Jun. 9, 2008, 14 pages.
Reexam Litigation Search conducted in U.S. Reexam Appl. No. 90/009,112, Mar. 4, 2009, 14 pages.
Reexam Litigation Search conducted in U.S. Reexam Appl. No. 90/099,088, Apr. 9, 2008, 30 pages.
Reexam Litigation Search conducted in U.S. Reexam Appl. No. 90/099,088, Jun. 30, 2009, 19 pages.
Reexam Litigation Search conducted in U.S. Reexam Appl. No. 90/099,088, Mar. 4, 2009, 11 pages.
Reply Memorandum of Points and Authorities in Support of Defendant Motorola, Inc.'s Motion for Summary Judgement; ; U.S. District Court—Central District of California; Case No. CV 03-6284 JFW (FMOx); *QR Spex, Inc. and Thomas G. Swab* v. *Motorola, Inc. and Frog Design, Inc.*; Filed Jun. 7, 2004; this lawsuit was transferred to the Central District of California from the Eastern District of Texas and is currently pending.
Stipulation to Amend Pleadings in Consolidated Cases Transferred from Eastern District of Texas; U.S. District Court—Central District of California, Southern Division; Case No. 07-CV-00987 CJC (RNBx); *QR Spex, Inc.* v. *Motorola, Inc. et al.*; Filed Sep. 5, 2007; this lawsuit was transferred to the Central District of California from the Eastern District of Texas and is currently pending.
Summons for Complaint for Patent Infringement; U.S. District Court—Central District of California; Case No. CV 09-624 CAS (JWJx); *Oakley, Inc.* v. *Digitalrise, LLC.*; Filed Jan. 27, 2009; this lawsuit is currently pending.
Theil, Stefan. "Love Those Wearables!", Newsweek, Apr. 9, 2001. http://nl.newsbank.com/nl-search/we/Archives?p_action=doc&p_docid=0EC05F8D8A26. Apr. 15, 2004.

* cited by examiner

EYEGLASSES WITH ELECTRONIC COMPONENTS

CROSS-REFERENCE TO RELATED APPLICATIONS

The present application is a continuation of U.S. application Ser. No. 11/418,154, filed May 3, 2006, which is a continuation of U.S. application Ser. No. 11/371,692, filed Mar. 9, 2006, now U.S. Pat. No. 7,231,038, which is a continuation of U.S. application Ser. No. 09/888,280, filed Jun. 21, 2001, now U.S. Pat. No. 7,013,009, which are all incorporated by reference herein.

BACKGROUND OF THE INVENTION

1. Field of the Invention

This invention relates to wearable audio communication devices and, more particularly, to eyeglasses with wireless audio communication features for remote use of a cell phone or other electronic device.

2. Description of the Related Art

Technological advances in the telecommunications and computer-related industries have provided cell phones, web phones, personal digital assistants (PDA's), hand held computers, lap tops, and other portable devices that allow for instant communication and access to information. These portable devices provide the benefit of allowing people to be connected wherever they are. A drawback to the use of cell phones, however, is that speaking on a cell phone can be a disturbance to bystanders. This is especially the case in public and other places where others generally do not want to be disturbed, such as restaurants, theaters, churches, and so forth. Similarly, using PDA's, laptops, etc. with capabilities for voice recognition and/or accessing and playing music or other audio can be an annoyance to others. Additionally, holding a cell phone to one's head while driving an automobile can be unsafe because the driver has only one hand available to operate the vehicle. Furthermore, holding a cell phone can be difficult or at least a distraction in many other situations, such as while typing on a keyboard, walking down a street or in a mall with one's hands full, while riding a bike, and so forth.

In order to provide an easier, safer, and quieter way to speak on a cell phone, there have been developed hands-free headsets with microphones and speakers connected by wires or wirelessly to a phone. These headsets enable the wearer to park their cell phone on their belt or elsewhere, and to have a conversation on their cell phone by speaking and listening via the headset. However, such headsets are typically donned and removed each time the cell phone is used, which can be a significant inconvenience. Also, such headsets must be stored somewhere when they are removed and not in use, making it more likely that the user will forget them, break them, or be further inconvenienced by carrying a case for them.

Accordingly, there remains a need in the art for a wearable audio communication device for remote use of a cell phone or other electronic device, that permits the user to easily, safely, and quietly communicate using the cell phone while engaged in another activity, without the user having to hold the cell phone in his hand, and without the inconvenience of carrying around an extra headset device, donning the headset to make or receive a call, and removing and storing the headset afterward.

SUMMARY OF THE INVENTION

The present invention fulfills these and other needs by providing wearable communications devices for sending and receiving signals wirelessly to and from a remote cell phone or other electronic device. Generally described, the invention comprises an eyeglasses device having an eyeglasses frame and having a microphone, a transmitter, a speaker, a receiver, and a power source connected together and mounted to the frame. Whenever a user has on the eyeglasses, he can converse over the cell phone privately, easily, and in a hands-free manner. Particularly for people who wear prescription glasses, the invention provides a great convenience, as they will often or most always be wearing their glasses. Thus, users can have private, hand-free conversations on their cell phones, without having to put on a headset, and afterward remove, store, and carry the headset.

In an exemplary embodiment of the invention, the eyeglasses frame has a lens holder and two support arms, and the microphone is directional and coupled to the lens holder (or one of the support arms) and oriented toward a user's mouth. The transmitter communicates by wires or otherwise with the microphone, and sends signals wirelessly (such as by radio frequency) to the cell phone. One (or more) speakers are coupled to one (or more) of the support arms and positioned adjacent to the user's ear. The receiver communicates by wires or otherwise with the speaker, and receives signals from the cell phone. The power source is electrically connected to the transmitter and to the receiver for providing the power needed to operate them.

Alternative embodiments additionally have pivotal, telescopic, and/or other extension arms for the microphone and/or the speaker. These embodiments allow the microphone and/or speaker to be extended, pivoted, or otherwise moved to a position for ease of use, and then retracted, pivoted, or otherwise moved to a stored position out of the way when not in use.

Additional alternative embodiments provide wearable communication devices with a clip-on member (instead of an eyeglasses frame) that mounts to a pair of conventional eyeglasses. Similar to the above embodiments, these have a microphone, a transmitter, a receiver, a speaker, and a power source, all mounted to the clip-on member. These embodiments permit retrofitting the wearable device onto a user's current glasses so that it is not necessary to go out a buy a new pair of glasses. Also, the user can easily change the wearable device from one pair of glasses to another.

In one of these embodiments, the clip-on member comprises a conventional clip-on lens holder of the type that is commonly used for clipping tinted sunglasses lenses onto regular prescription glass frames. In other of these embodiments, the clip-on member comprises a frame or sheet with a clip for removably mounting to the support arm of the eyeglasses frame. The microphone and speaker can be mounted directly onto the clip-on member in a spaced apart arrangement, or they can be mounted on extension arms that can be extended, pivoted, or otherwise moved to a position for use, and then moved to a stored position when not in use.

Further alternative embodiments provide wearable communication devices with a frame in the form of a hat, headband, earmuffs, or another article that can be worn on a user's head. Similar to the above embodiments, these have a microphone, a transmitter, a receiver, a speaker, and a power source, all mounted to the frame. These embodiments provided similar benefits, for instance, a user can wear a hat and use the communications features to conveniently and privately communicate on his or her cell phone.

The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE PREFERRED EMBODIMENT

Figure 1:
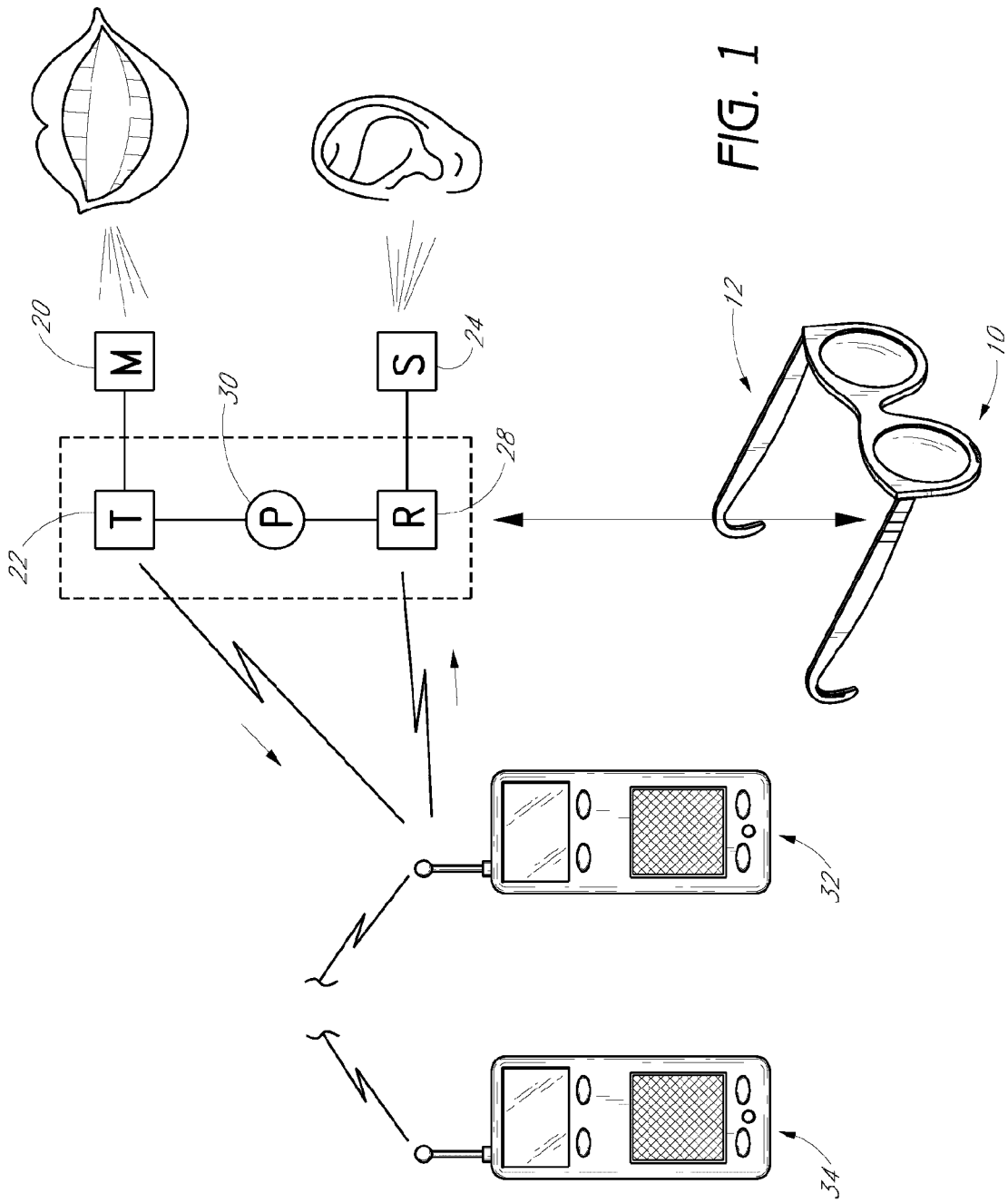
FIG. 1 is a schematic diagram of an exemplary embodiment of the eyeglasses of the present invention in use with a cell phone.

The present invention may be embodied in eyeglasses with communication features for sending and receiving signals wirelessly to and from an electronic device such as a cell phone. FIG. 1 shows one such embodiment, referred to as the eyeglasses 10, in use with a cell phone 32. The eyeglasses 10 have a microphone 20, a transmitter 22, a speaker 24, a receiver 28, and a power source 30, all mounted onto an eyeglasses frame 12. The microphone 20 receives sound from the user's mouth (or from the user clapping or otherwise making a sound) and converts the sound into a signal representing the sound, and the transmitter 22 sends the signal to the cell phone 32. The cell phone 32 in turn transmits the signal to another cell phone 34 or other electronic device. Similarly, the receiver 28 receives a signal representing a sound from the other cell phone 34, and sends the signal to the speaker 24. The speaker 28 then converts the signal to an audible sound to be heard by one or both of the user's ears.

Thus, the user can converse over the cell phone 32 privately, easily, and in a hands-free manner whenever he has on the eyeglasses 10. For example, the eyeglasses 10 can have prescription lenses, and for a person that wears his glasses much of the time, the communication features of the eyeglasses 10 will be readily available for use much of the time. Thus, the user can simply put on his eyeglasses 10 in the morning and take them off at night, as he normally does with his regular glasses, and wear his cell phone 32 on his belt, carry it in a purse or bag, or otherwise carry the cell phone remotely from the eyeglasses 10. In this manner, the user can converse on his cell phone 32 anytime and anywhere, privately, without disturbing bystanders.

Also, when wearing the eyeglasses 10, the user need not don and remove a headset every time he makes or receives a call, and need not store and carry the headset in a case or the like. Additionally, because the eyeglasses 10 provide for hands-free communication over the cell phone 32, the user can simultaneously converse on the cell phone 32 while engaging in another activity such as typing on a keyboard, driving, biking, mowing the lawn, eating, etc. Of course, the eyeglasses 10 can be alternatively provided as sun glasses or mere fashion glasses (with zero power lenses), to provide the convenience of the readily available communication features described above.

It will be understood that the cell phone 32 may need to be adapted for sending and receiving signals wirelessly to and from the eyeglasses 10. Such adaptations are known in the art, and can be readily made to provide a cell phone or other electronic device that cooperatively functions with the eyeglasses 10 as described herein. Also, the eyeglasses 10 and the cell phone 32 can be adapted for sending and receiving visual images to and from each other, and/or for sending and receiving data in other forms. Additionally, the eyeglasses 10 and/or the cell phone 32 can include encryption software providing for secure transmissions to and/or from each other. Furthermore, the eyeglasses 10 also can be used to communicate with web phones, conventional land line phones, PDA's, laptops, hand held computers, personal computers, household appliances, portable or stationary televisions, portable or stationary radios, compact disc players, tape players, or the like, and/or other electronic devices with capabilities for voice recognition and/or for accessing and playing music or other sounds.

Figure 2:
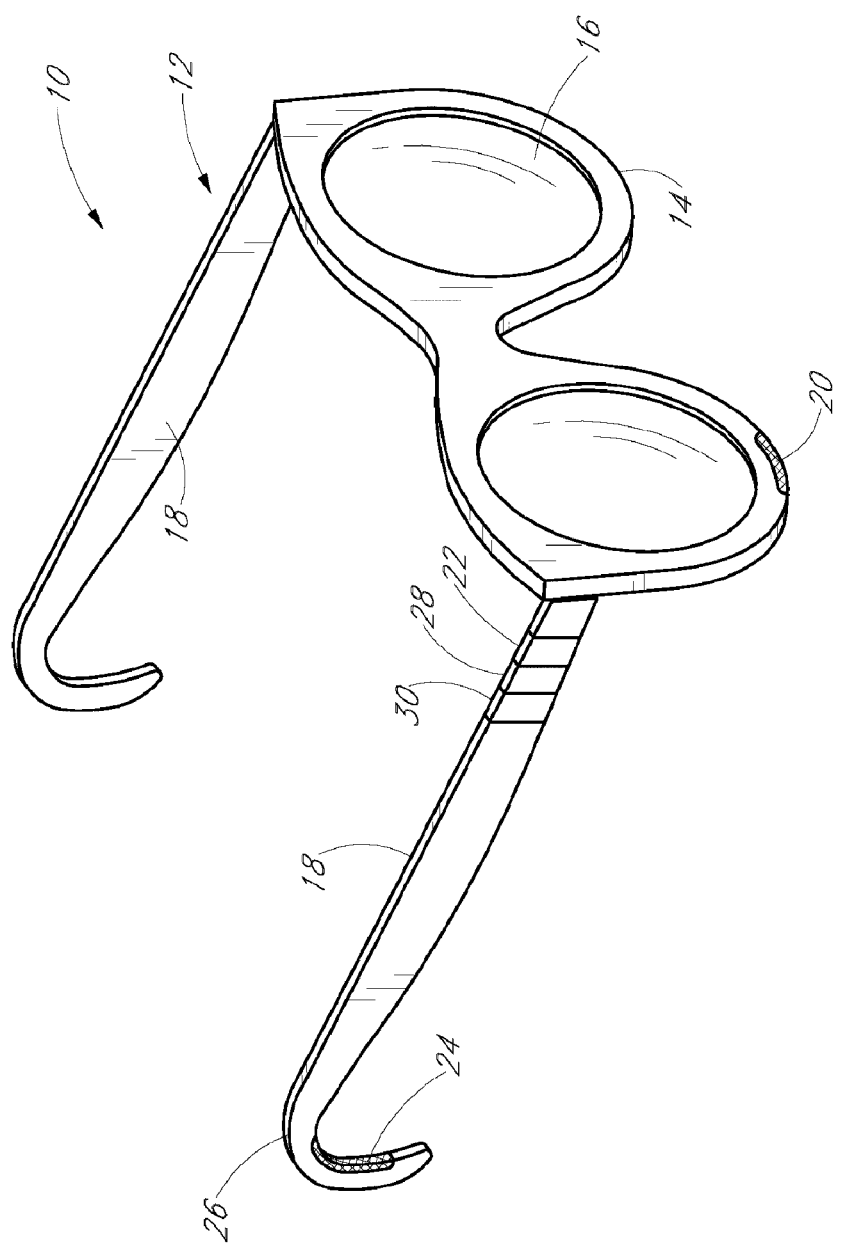
FIG. 2 is a perspective view of the exemplary embodiment of FIG. 1, showing an eyeglasses frame with a microphone and a speaker.

FIG. 2 shows an exemplary embodiment of the eyeglasses 10 of the present invention, with the eyeglasses frame 12 comprising a lens holder 14 with lenses 16, and two support arms 18 that extend over and are supported by a user's ears. The eyeglasses frame 12 can be provided by conventional eyeglass frames made of metal, plastic, or another material, having any of a variety of shapes, as is well known in the art. The lenses 16 can be provided by prescription lenses, tinted sunglasses lenses, a combination thereof, or zero power lenses, or no lenses can be provided, as may be desired. While the eyeglasses 10 are typically provided with two lenses and two support arms, it will be understood that the eyeglasses alternatively can be provided by a monocle.

The microphone 20 is mounted to the eyeglasses frame 12 for receiving sounds from the user's mouth to be transmitted to the cell phone. The microphone 20 can be provided by a conventional miniature microphone that is embedded into the frame 12. Also, the microphone 20 can be oriented toward the user's mouth and can be directional so that it picks up the user's voice when wearing the eyeglasses 10, but does not pick up as much ambient sound. Although one microphone 20 is shown mounted to the lens holder 14, alternatively, it can be mounted to the one of the support arms 18, and/or two or another number of microphones can be provided. Thus, the eyeglasses 10 can be provided with two directional microphones, each oriented toward user's mouth when wearing the eyeglasses, and each positioned on a lower portion of one of the two loops forming the lens holder 14. Also, a sensitivity control can be provided for adjusting the level of sound that the microphone 20 picks up.

The transmitter 22 is mounted to the eyeglasses frame 12 and communicates with the microphone 20 by wire, optic fiber, wirelessly, or otherwise. The transmitter 22 can be of a conventional miniature type that is configured to send signals to the cell phone. For example, the transmitter 22 can be configured with BLUETOOTH or other software for wireless transmission of radio signals or another frequency audio or other signals to the cell phone.

The speaker 24 is mounted to the eyeglasses frame 12 for playing sounds to be heard by the user's ear. The speaker 24 can be provided by a conventional miniature speaker that is embedded into the frame 12. Also, the speaker 24 can be oriented toward the user's ear and can be directional so that it plays sounds toward the user's ear but does not play sounds that can be easily heard by bystanders. For example, the speaker 24 can be a conventional miniature bone-type speaker that is mounted on an ear rest 26 of one of the support arms 18 generally adjacent to the user's ear when wearing the eyeglasses 10. Although one speaker 24 is shown mounted to the ear rest 26, alternatively, it can be mounted to another portion of one of the support arms 18 or to the lens holder 14. Also, two or another number of speakers can be provided for producing stereo, quadraphonic, or other sound. Also, a volume control can be provided for adjusting the level of sound that the speaker 24 plays.

The receiver 28 is mounted to the eyeglasses frame 12 and communicates with the speaker 24 by wire, optic fiber, wirelessly, or otherwise. The receiver 28 can be of a conventional miniature type that is configured to receive signals from the cell phone. For example, the receiver 28 can be configured with BLUETOOTH or other software for wireless reception of radio signals or another frequency audio or other signals from the cell phone.

The power source 30 is mounted to the eyeglasses frame 12 and electrically connected by a wire to the transmitter 22 and the receiver 28. The power source 30 provides the power to operate the transmitter 22 and the receiver 28. For example, the power source 30 can be provided by one or another number of batteries that screw into a receptacle in the frame 12. Alternatively, other portable power sources can be used, such as conventional batteries, photovoltaic cells, combinations thereof, and so forth. Controls can be provided for automatically shutting off the device after a predetermined period of time and automatically turning on the device upon reception of a signal from the cell phone, and a manual on/off switch and/or a low power indicator can be provided.

It will be understood by those skilled in the art that the transmitter 22, receiver 28, and power source 30 can be selected to provide low power, short range signals, so as not to interfere with signals to and from other devices in the vicinity of the user. However, these components are also selected to provide signals strong enough for transmission and reception between the eyeglasses 10 on the user's head and the cell phone 32 disposed remotely from the eyeglasses, such as on the user's belt, carrying bag or purse, etc. Also, the transmitter 22 and the receiver 28 can have optics for receiving infrared signals, instead of or in addition to radio frequency signals.

Additionally, the transmitter 22, receiver 28, and/or battery 30 can be provided as separate components or as a single component with a single antenna, mounted to the eyeglasses frame 12 at another position selected for ease of manufacturing. Also, the wires connecting the microphone 20 to the transmitter 22, the receiver 28 to the speaker 24, and/or the battery 30 to the transmitter 22 and the receiver 28, can be embedded into or mounted onto the frame 12. Furthermore, the microphone 20, transmitter 22, receiver 28, speaker 24, and/or battery 30 can be provided as a retrofit kit, with each component having clips for mounting onto a conventional eyeglasses frame, with the wires not integral to but instead routable along the frame. Additionally or alternatively, one or more wires with connectors can be provided that connect the eyeglasses and the cell phone, as may be desired.

Figure 3:
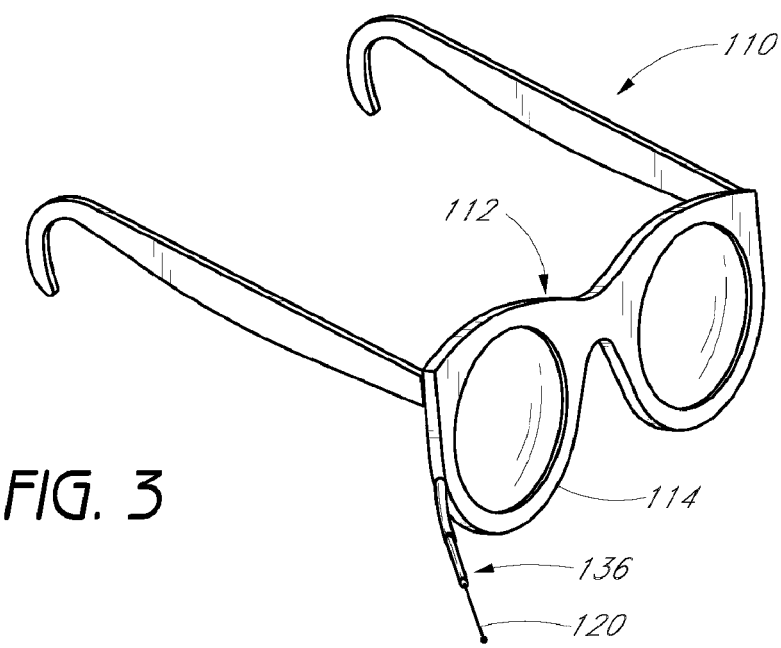
FIG. 3 is a perspective detail view of a first alternative embodiment of the present invention, showing the microphone on a telescopic arm.
Figure 4:
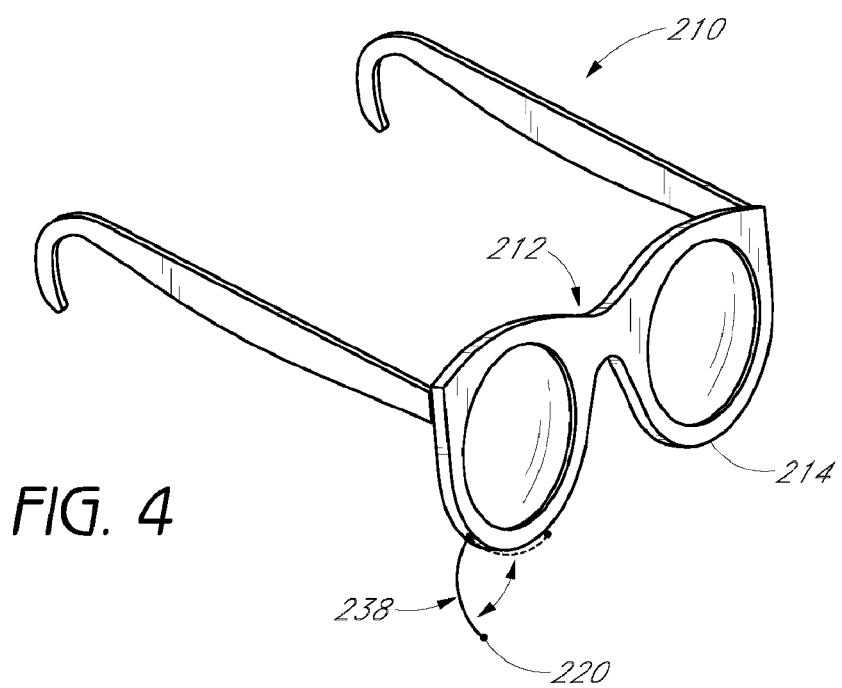
FIG. 4 is a perspective detail view of a second alternative embodiment, showing the microphone on a pivotal arm coupled to a lens holder.
Figure 5:
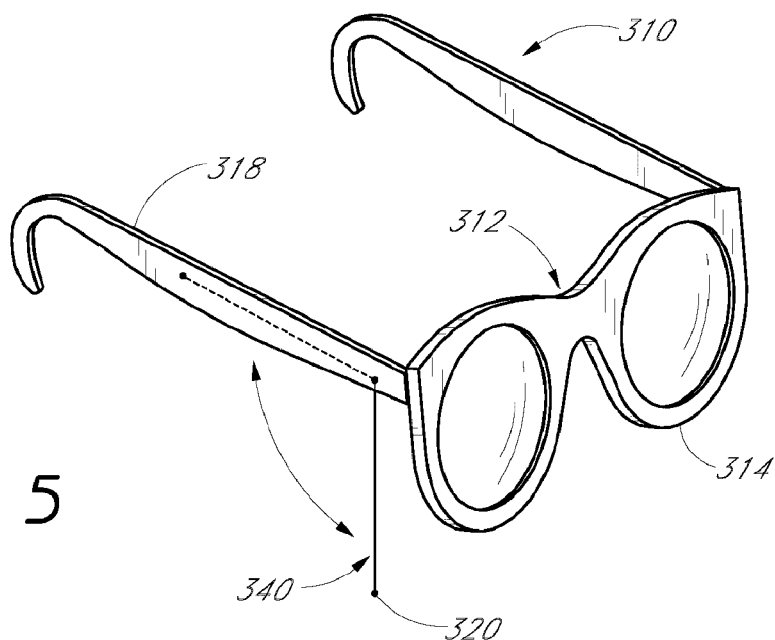
FIG. 5 is a perspective detail view of a third alternative embodiment, showing the microphone on a pivotal arm coupled to a support arm.

FIG. 3 shows a first alternative embodiment 110 of the present invention, with the microphone 120 attached to a telescopic extension arm 136 that retracts into the lens holder 114 or another part of the eyeglasses frame 112. FIG. 4 shows a second alternative embodiment 210, with the microphone 220 attached to a pivotal extension arm 238 that is pivotally connected to the lens holder 214. Such an extension arm 238 can be curved to conform to the shape of the lens holder 214. FIG. 5 shows a third alternative embodiment 310, with the microphone 320 attached to a pivotal extension arm 340 that is pivotally connected to the corresponding support arm 318. Such an extension arm 340 can be generally linear to conform to the shape of the corresponding support arm 318.

In these alternative embodiments, the microphone can be extended, pivoted, or otherwise moved into a first position when needed for use, and retracted, pivoted, or otherwise moved to a second non-obtrusive position when not needed. Also, the extension arm can be generally rigid or flexible, with or without a telescopic, pivotal, or other connection to the eyeglasses frame, as may be desired.

Figure 6:
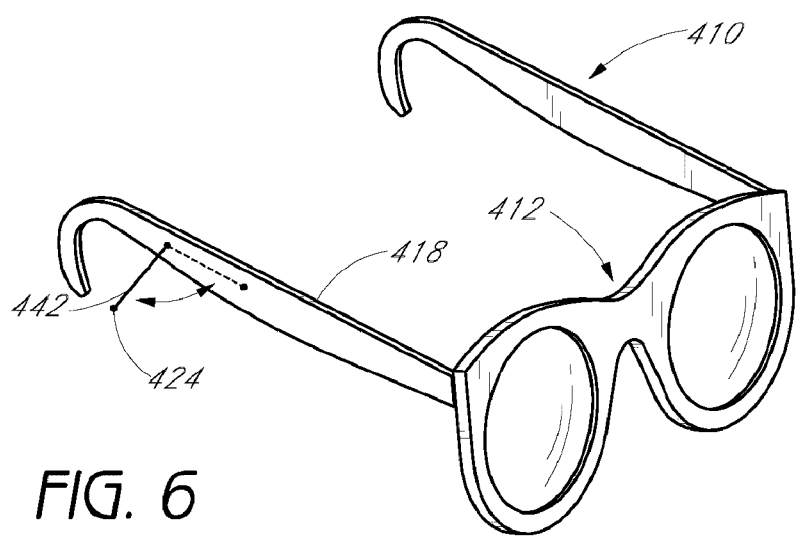
FIG. 6 is a perspective detail view of a fourth alternative embodiment, showing the speaker on a pivotal arm coupled to the support arm.

FIG. 6 shows a fourth alternative embodiment 410 of the present invention, with the speaker 424 attached to a pivotal extension arm 442 that is pivotally connected to one of the support arms 418. Of course, the extension arm can be telescopic, generally rigid, or generally flexible, as may be desired. In this alternative embodiment, the speaker 424 can be extended, pivoted, or otherwise moved into a first position when needed for use, and retracted, pivoted, or otherwise moved to a second non-obtrusive position when not needed.

Figure 7:
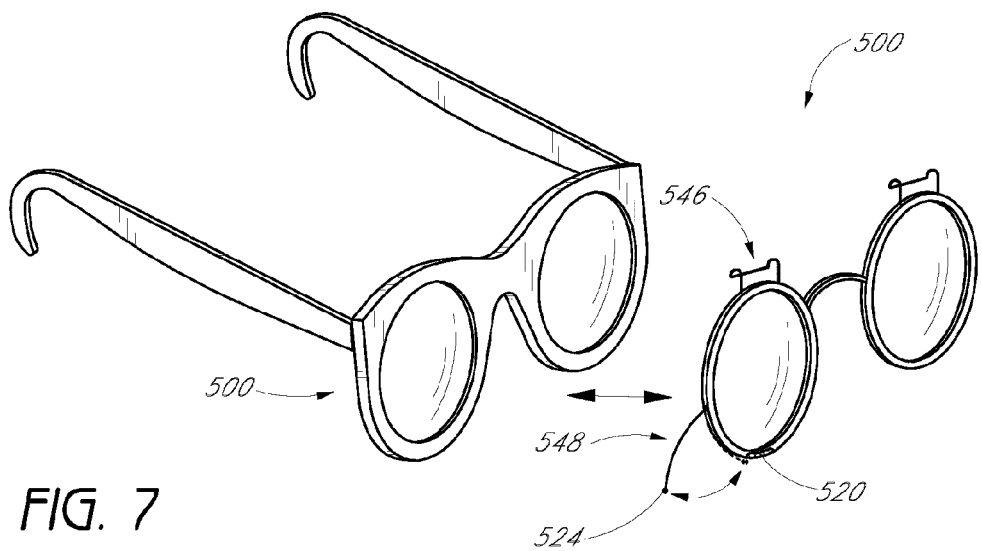
FIG. 7 is a perspective view of a fifth alternative embodiment, showing a clip-on lens holder with a microphone and a speaker.
Figure 8:
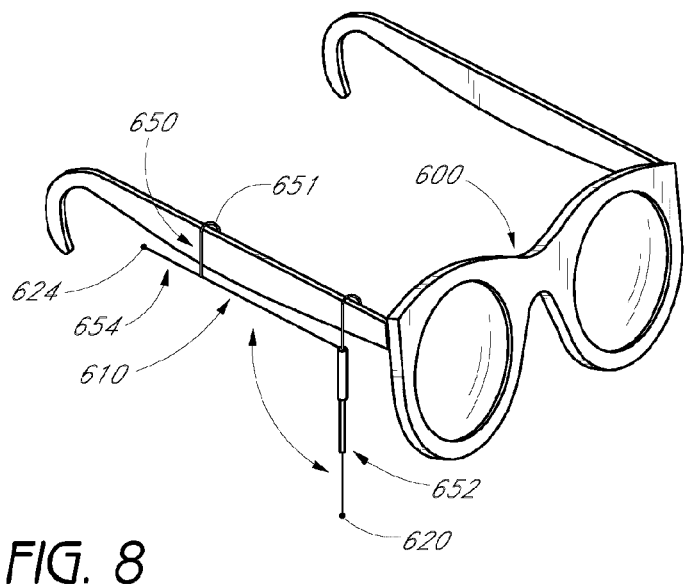
FIG. 8 is a perspective view of a sixth alternative embodiment, showing a clip-on frame member with a microphone and a speaker attached to the frame member.
Figure 9:
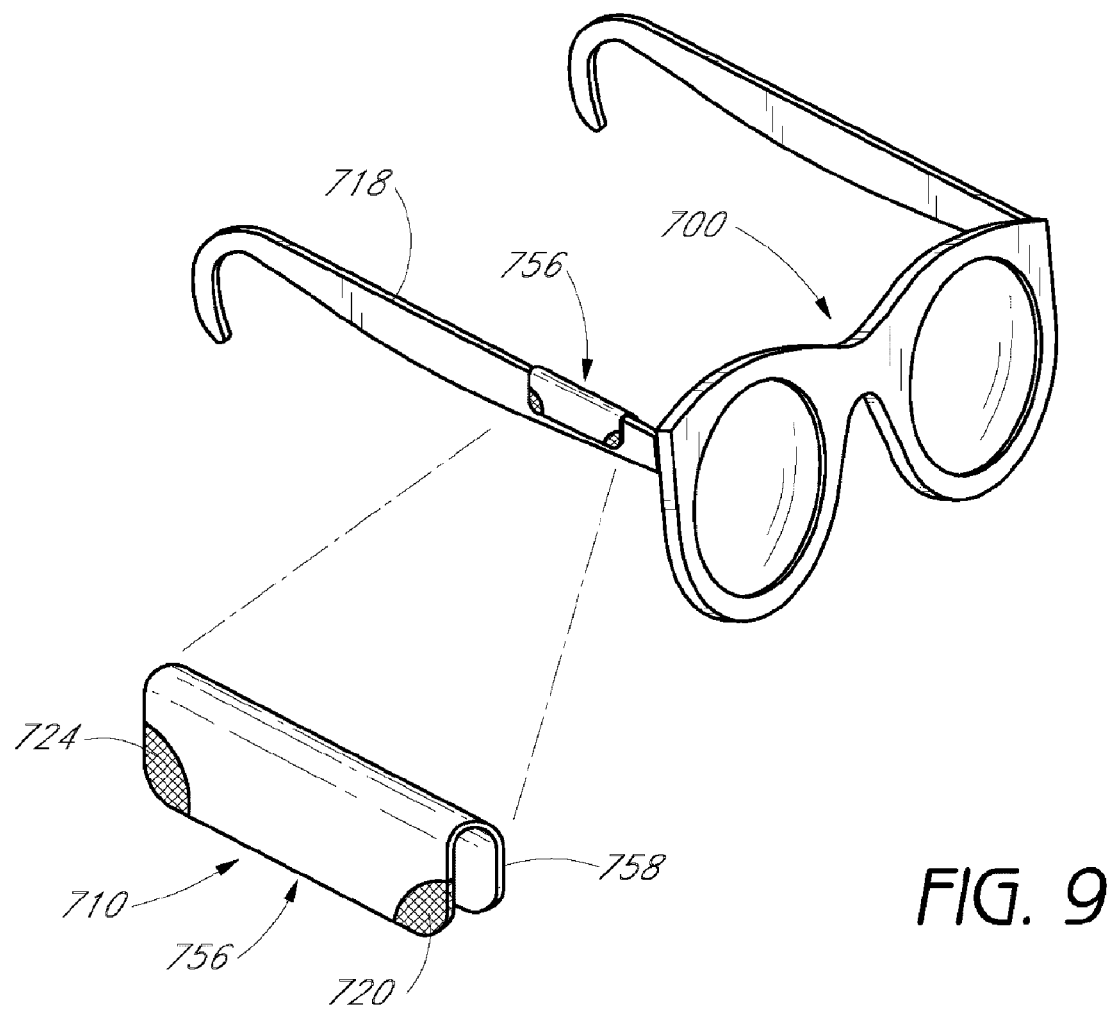
FIG. 9 is a perspective view of a seventh alternative embodiment, showing a clip-on sheet member with a built-in microphone and a built-in speaker.

FIGS. 7-9 show additional alternative embodiments of the present invention. In these embodiments, instead of the communication components being mounted directly to the eyeglasses, there is provided an attachment member having at least one connector that permits removably mounting the member onto a conventional eyeglasses frame. The connector is provided by a clip, though another mounting structure can be used as desired, such as a hook, snap, screw, or slide. The communication components (including the transmitter, the receiver, and the power source) are mounted to the clip-on member so that they can be readily utilized when the clip-on member is mounted to the user's glasses. Accordingly, the user can selectively mount the clip-on member on different pairs of glasses, as may be desired where the user has separate prescription and sun glasses, has multiple glasses that she wears depending on the mood and the occasion, purchases new eyeglasses, etc.

For example, FIG. 7 shows a fifth alternative embodiment 510 with the attachment member provided by a conventional clip-on lens holder 544 and the connector provided by two (or another number) of clips 546 for mounting onto the lens holder of a conventional eyeglasses frame 500. The microphone 520 and the speaker 524 are mounted to the lens holder 544. The speaker 524 is connected to the lens holder 544 by a pivotal extension arm 548 or by another extension arm, and the microphone can be embedded or otherwise attached to the clip-on lens holder.

FIG. 8 shows a sixth alternative embodiment 610 with the attachment member provided by a frame 650 and the connector provided by a clip 651 formed by a bent section of the frame 650, for mounting onto one of the support arms of a conventional eyeglasses frame 600. The microphone 620 and the speaker 624 are attached to the clip frame 650, with the microphone 620 attached by a pivotal and/or telescopic extension arm 652 or other extension arm, and the speaker 624 attached by a pivotal extension arm 654 or other extension arm.

FIG. 9 shows a seventh alternative embodiment 710 with the attachment member provided by a sheet 756 and the connector provided by a clip 758 formed by a bent section of the sheet 756 for mounting onto one of the support arms of a conventional eyeglasses frame. The microphone 720 and the speaker 724 are built into the sheet 756 at spaced apart positions, and are directional and oriented towards the user's mouth and ear, respectively, when wearing the clip-on attachment member on glasses. Of course, the devices of the sixth and seventh alternative embodiments could be used with devices other than eyeglasses, such as hats, visors, headbands, and so forth.

Figure 10:
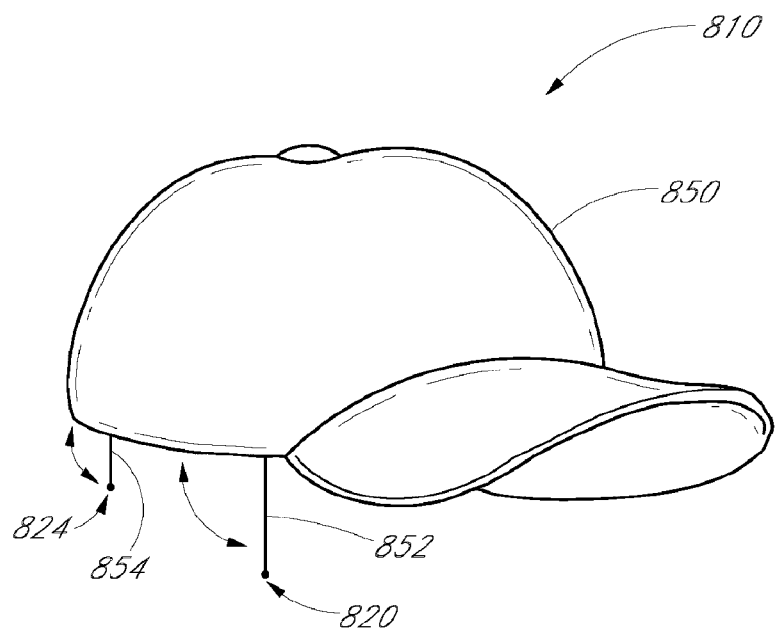
FIG. 10 is a side view of an eighth alternative embodiment, showing a hat with a built-in microphone and a built-in speaker.
Figure 11:
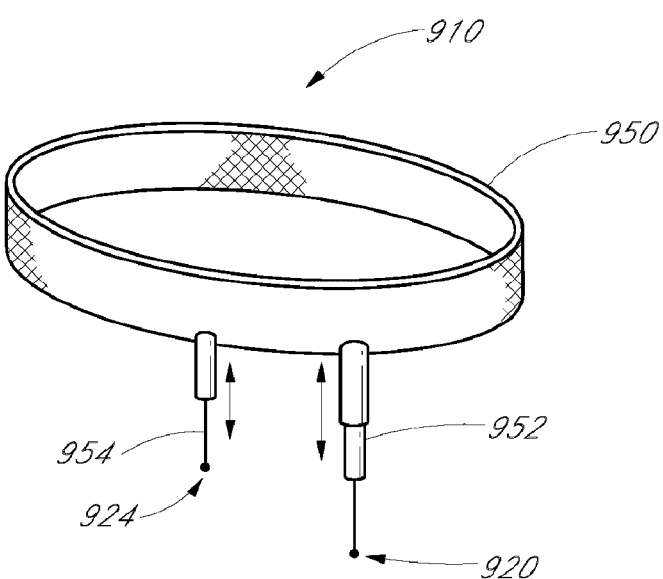
FIG. 11 is a perspective view of a ninth alternative embodiment, showing a headband with a built-in microphone and a built-in speaker.

FIGS. 10 and 11 show further alternative embodiments of the present invention. In these embodiments, the communication components are mounted to articles that users commonly wear on their head for fashion, warmth, or other reasons. The microphone is directional and oriented toward the user's mouth, and the speaker is disposed adjacent to and oriented toward the user's ear, thereby permitting the user to conveniently and privately communicate on his or her cell phone.

In particular, FIG. 10 shows an eighth alternative embodiment 810 comprising a hat that forms a frame 850, with the microphone 820 and the speaker 824 attached to the frame 850 by pivotal, telescopic, static, or other extension arms 852 and 854, respectively. Similarly, FIG. 11 shows a ninth alternative embodiment 910 comprising a headband that forms a frame 950, with the microphone 920 and the speaker 924 attached to the frame 950 by pivotal, telescopic, static, or other extension arms 952 and 954, respectively.

It will be understood that the term "hat" as used herein means any structure that is typically worn on a person's head, including a baseball cap, cowboy hat, motorcycle or sports helmet, visor, derby, bonnet, panama, sun hat, beret, tam-o'-shanter, yarmulke, beenie, fedora, and so forth. It will be further understood that, in addition to hats, the communication features can be provided on any other article worn on a person's head, such as earmuffs, ski masks, hoods on jackets, and so forth.

In view of the foregoing, it will be appreciated that present invention provides several wearable audio communication devices for remotely using a cell phone or other electronic device, that permit the user to easily, safely, and privately communicate using the cell phone, even while engaged in another activity. Furthermore, the devices provided by the invention obviate the need for the user to hold the cell phone in his hand to use the phone, or to carry around, put on, and remove a headset device to use the phone privately and hands-free.

While certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

What is claimed is:

1. An electronically enabled eyewear, comprising:
   an eyeglass frame comprising:
   a lens holder configured to support at least one lens in a line of sight of a wearer when a wearer wears the eyeglass frame;
   a first support arm extending from a forward portion of the frame; and
   a second support arm extending from the forward portion of the eyeglass frame,
   wherein the first and second support arms are configured to extend rearwardly from the forward portion of the eyeglass frame toward a back of a head of the wearer when the wearer wears the eyeglass frame;
   at least one speaker supported by the eyeglass frame and being configured to be positionable in an orientation that faces toward an ear of a wearer when the wearer wears the eyeglass frame;
   an electronic component coupled to the eyeglass frame, the electronic component configured to enable communication with the wearer when the eyeglass frame is worn; and
   a retractable extension arm attached to the eyeglass frame, the retractable extension arm comprising a first end region and a second end region,
   wherein the retractable extension arm is attached to the lens holder of the eyeglass frame at a pivot located at the first end region,
   wherein the retractable extension arm is attached to the electronic component at the second end region, and
   wherein the retractable extension arm is configured to move the electronic component toward and away from the eyeglass frame when the retractable extension arm is rotated about the pivot.

2. The electronically enabled eyewear of claim 1, wherein the electronic component comprises a microphone, the microphone being positionable with the retractable extension arm at a position near a mouth of the wearer when the wearer wears the eyeglass frame.

3. The electronically enabled eyewear of claim 1, wherein the retractable extension arm is configured to retract into the eyeglass frame.

4. The electronically enabled eyewear of claim 1, wherein the retractable extension arm is attached to the lens holder at the first end region.

5. The electronically enabled eyewear of claim 1, wherein the retractable extension arm comprises a telescoping arm.

6. The electronically enabled eyewear of claim 1, further comprising a wireless transmitter supported by the frame and configured to transmit signals to a wireless device.

7. The electronically enabled eyewear of claim 1, further comprising a wireless receiver supported by the frame and configured to receive signals from a wireless device.

8. The eyeglass for audio communication of claim 1, further comprising at least one speaker support arm coupled to the eyeglass frame, wherein the at least one speaker is coupled to the eyeglass frame with the at least one speaker support arm.

9. The eyeglass for audio communication of claim 8, wherein the at least one speaker support arm is pivotally coupled to the eyeglass frame.

10. The eyeglass for audio communication of claim 8, wherein the at least one speaker support arm comprises a plurality of segments.

11. An electronically enabled eyewear, comprising:
    an eyeglass frame comprising:
    a lens holder configured to support at least one lens in a line of sight of a wearer when a wearer wears the eyeglass frame;
    a first support arm extending from a forward portion of the frame; and
    a second support arm extending from the forward portion of the eyeglass frame, wherein the first and second support arms are configured to extend rearwardly from the forward portion of the eyeglass frame toward a back of a head of the wearer when the wearer wears the eyeglass frame;

an electronic component coupled to the eyeglass frame, the electronic component configured to enable communication with the wearer when the eyeglass frame is worn; and a movable extension arm attached to the eyeglass frame, the movable extension arm comprising first and second end regions, wherein the movable extension arm is attached to the forward portion of the eyeglass frame at the first end region and extends from the forward portion of the eyeglass frame rearwardly when the wearer wears the eyeglass frame, wherein the movable extension arm is attached to the electronic component at the second end region, and wherein the electronic component is movable toward and away from the eyeglass frame with the movable extension arm.

12. The electronically enabled eyewear of claim 11, wherein the electronic component comprises a microphone, the microphone being positionable with the movable extension arm at a position near a mouth of the wearer when the wearer wears the eyeglass frame.

13. The electronically enabled eyewear of claim 11, wherein the movable extension arm is configured to retract into the eyeglass frame.

14. The electronically enabled eyewear of claim 11, wherein the movable extension arm is attached to the lens holder at the first end region.

15. The electronically enabled eyewear of claim 11, wherein the movable extension arm comprises a telescoping arm.

16. The electronically enabled eyewear of claim 11, further comprising a wireless transmitter supported by the frame and configured to transmit signals to a wireless device.

17. The electronically enabled eyewear of claim 11, further comprising a wireless receiver supported by the frame and configured to receive signals from a wireless device.

18. The eyeglass for audio communication of claim 11, further comprising at least one speaker support arm coupled to the eyeglass frame, wherein the at least one speaker is coupled to the eyeglass frame with the at least one speaker support arm.

19. The eyeglass for audio communication of claim 18, wherein the at least one speaker support arm is pivotally coupled to the eyeglass frame.

20. The eyeglass for audio communication of claim 18, wherein the at least one speaker support arm comprises a plurality of segments.

* * * * *

UNITED STATES PATENT AND TRADEMARK OFFICE
CERTIFICATE OF CORRECTION

PATENT NO. : 8,010,156 B2
APPLICATION NO. : 12/859162
DATED : August 30, 2011
INVENTOR(S) : Warren It is certified that error appears in the above-identified patent and that said Letters Patent is hereby corrected as shown below:

In column 2 (item 56) page 2 at line 33, under other publications, change "8999" to --899--.

In column 2 (item 56) page 2 at line 47, under other publications, change "Californai CAse" to --California; Case--.

In column 1 (item 56) page 3, under other publications, change "Peition" to --Petition--.

Signed and Sealed this
Twenty-eighth Day of February, 2012

David J. Kappos
*Director of the United States Patent and Trademark Office*